United States Patent [19]

Yoshimura

[11] Patent Number: 5,402,204
[45] Date of Patent: Mar. 28, 1995

[54] CAMERA

[75] Inventor: Hirofumi Yoshimura, Nakano, Japan

[73] Assignee: Kabushiki Kaisha Cosina, Nakano, Japan

[21] Appl. No.: 111,698

[22] Filed: Aug. 25, 1993

[30] Foreign Application Priority Data

Apr. 3, 1993 [JP] Japan .................. 5-100459
Jun. 11, 1993 [JP] Japan .................. 5-140847

[51] Int. Cl.⁶ ............................................ G03B 17/18
[52] U.S. Cl. ..................... 354/471; 354/484; 354/486; 354/266
[58] Field of Search ............... 354/484, 486, 465, 471, 354/289.1, 289.12, 266

[56] References Cited

U.S. PATENT DOCUMENTS

| | | | |
|---|---|---|---|
| 4,328,456 | 5/1982 | Suzuki et al. | 354/484 |
| 4,449,057 | 5/1984 | Ishiwata | 354/484 |
| 4,494,854 | 1/1985 | Yamaga et al. | 354/484 |
| 4,642,413 | 2/1987 | Ovshinsky | 354/484 X |

Primary Examiner—W. B. Perkey
Attorney, Agent, or Firm—Jordan and Hamburg

[57] ABSTRACT

The camera of the invention has a clean and semi-external electric source. In the camera, an electric section includes a photometric circuit and a display unit. A solar cell is the electric source. A capacitor is charged by the solar electric power. A release switch is linked with a shutter release button. The release switch connects the solar cell and the capacitor and disconnects the solar cell and the capacitor when the shutter release button is half pushed. The release switch drives a shutter when the shutter release button is fully pushed. A selecting switch is connected to the release switch. The selecting switch has a first position, at which the solar cell and an electric section are connected and the capacitor and the electric section are disconnected, and a second position, at which the solar cell and the electric section are disconnected and the capacitor and the electric section are connected.

8 Claims, 5 Drawing Sheets

CAMERA

BACKGROUND OF THE INVENTION

The present invention relates to a camera, more precisely relates to a camera, which has an electric section, which includes a photometric circuit, a display unit for showing a result of photometry, and a driver circuit for driving the display unit, and an electric source for supplying electric power to the electric section.

In a conventional camera, batteries are used for the electric source so as to drive the photometric circuit, the display unit, etc.

However, the batteries, which have wasted, are usually scrapped. Scrapping batteries not only waste natural resources but also cause public pollution.

SUMMARY OF THE INVENTION

An object of the invention is to provide a camera, which has a clean and semi-eternal (extremely long-life) solar battery, and which is capable of use in not only light places but also dark places.

To achieve the object, the camera of the present invention comprises:

an electric section including a photometric circuit, a display unit for showing a result of photometry, and a driver circuit for driving the display unit;

a solar cell, as an electric power source, being provided in an upper cover of the camera;

a capacitor being charged the electric power, which is generated by the solar cell;

a release switch being linked with a shutter release button, the release switch connecting the solar cell and the capacitor and disconnecting the solar cell and the capacitor when the shutter release button is half pushed, the release switch driving a shutter when the shutter release button is fully pushed; and a selecting switch being connected to the release switch, the selecting switch having, a first position, at which the solar cell and an electric section are connected and the capacitor and the electric section are disconnected, and a second position, at which the solar cell and the electric section are disconnected and the capacitor and the electric section are connected.

The camera of the present invention having another constitution comprises:

an electric section including a photometric circuit, a display unit for showing a result of photometry, and a driver circuit for driving the display unit;

a solar cell, as an electric power source, being provided in an upper cover of the camera;

a capacitor being charged the electric power, which is generated by the solar cell;

a release switch for driving the electric section when a shutter release button is half pushed; and a mode selecting switch for changing modes of the camera to, a first mode, in which the solar cell is connected to the electric section, the solar cell is disconnected to the capacitor and the capacitor is disconnected to the electric section, a second mode, in which the solar cell is connected to the capacitor and the electric section is disconnected to the solar cell and the capacitor, and a third mode, in which the capacitor is connected to the electric section, the solar cell is disconnected to the capacitor and the solar cell is disconnected to the electric section.

In the camera of the present invention, the electric power is supplied to the photometric circuit, the display unit, the driver circuit by the solar cell, so that the electric power can be got from clean solar energy and public pollution can be prevented. Furthermore, the camera can be used for photometerizing and displaying in light places and dark places because it has the capacitor and the selecting switch, which is capable of selecting the capacitor and the solar cell.

BRIEF DESCRIPTION OF THE DRAWINGS

Embodiments of the present invention will now be described by way of examples and with reference to the accompanying drawings, in which.

DETAILED DESCRIPTION OF PREFERRED EMBODIMENTS

Preferred embodiments of the present invention will now be described in detail with reference to the accompanying drawings.

Figure 1:
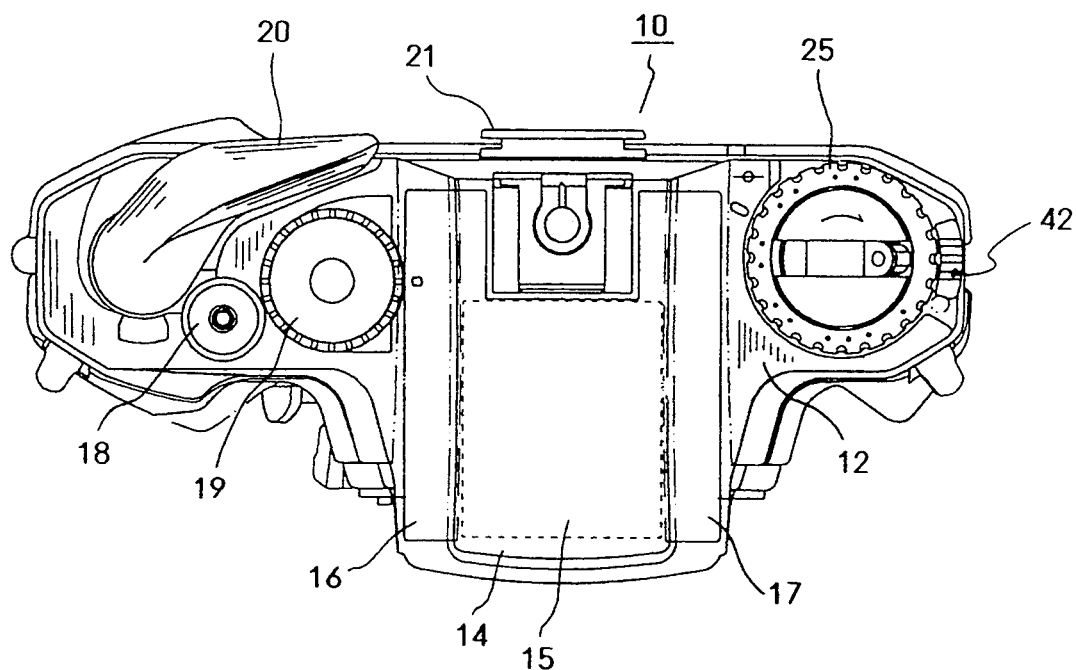
FIG. 1 is a plan view of the camera without lenses.
Figure 2:
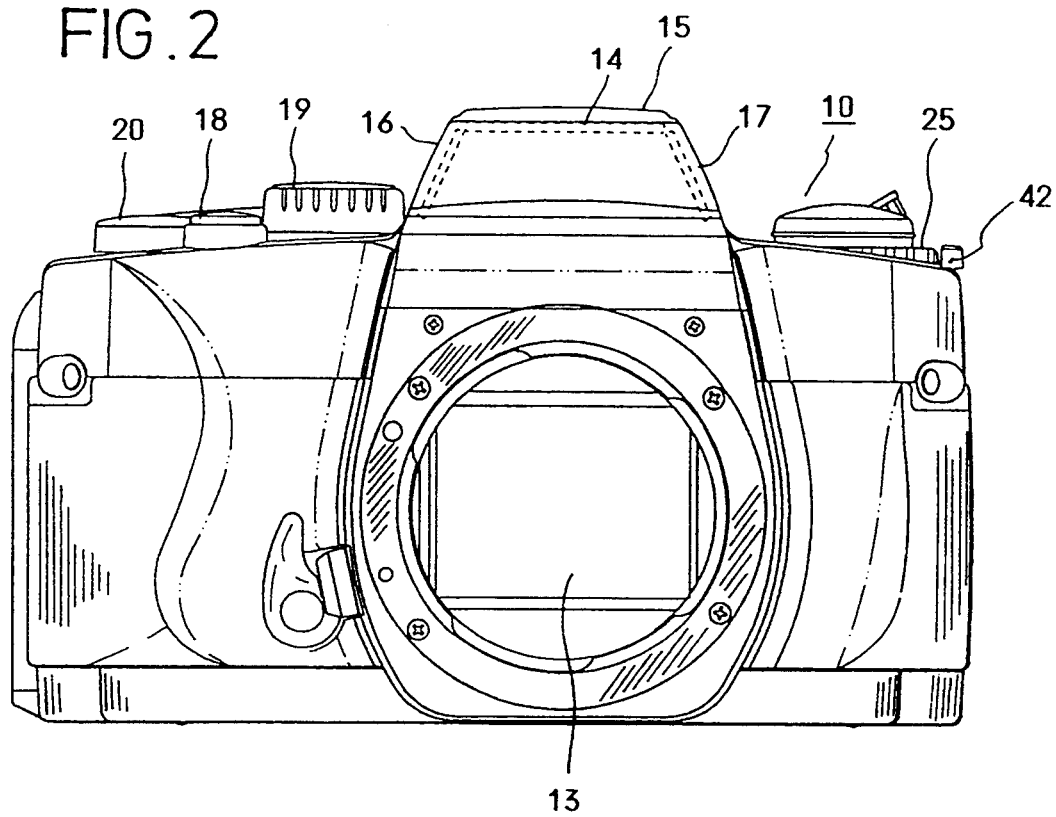
FIG. 2 is a front view of the camera without lenses.

A single-lens reflex camera 10 is shown in FIGS. 1 and 2.

A center part 14 of an upper cover 12, which covers a penta-prism (not shown), of the camera 10 is projected upward.

There are provided solar cells 15, 16 and 17 on an upper face and both side faces of the projected part 14 of the upper cover 12.

Each solar cell 15, 16 and 17 is divided into a plurality of segments, which are mutually connected serially and/or parallel. And the solar cells 15, 16 and 17 are connected serially so as to generate required voltage.

Note that, the camera 10 has a shutter release button 18, a shutter speed setting dial 19, a film winding lever 20, a view finder 21 and a film sensitivity setting dial 25.

Figure 3:
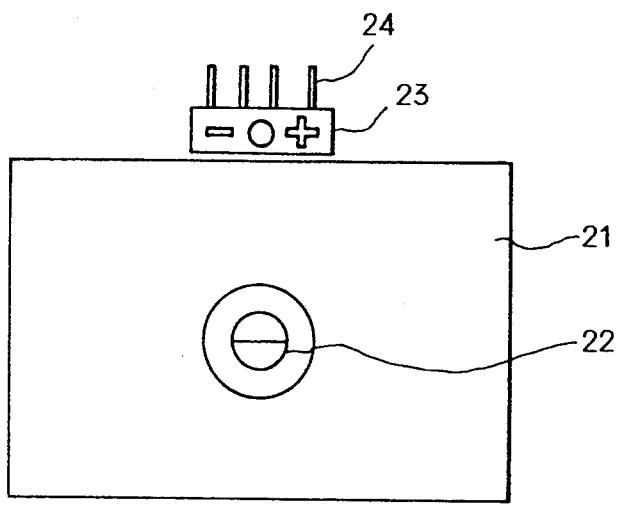
FIG. 3 is an explanation view of an LCD unit.

The view finder 21 is shown in FIG. 3. The camera 10 further has a split image prism for focusing and an LCD (Liquid crystal display) unit 23, which is provided in an upper section of the view finder 21. The LCD unit 23 has electrodes 24.

The LCD unit 23 displays conditions of overexposure (+), proper exposure (○) and underexposure (−) on the basis of a result of a photometric circuit.

External light is introduced into the LCD unit 23 by a mirror 13 and the penta-prism for lighting. The external light may be introduced by a light guide (not shown).

There is provided a known photometric element, e.g., CdS, in the vicinity of the penta-prism. A photometric circuit is a known bridge circuit having the photometric element as one member and variable resistances (volumes) for defining lens aperture, shutter speed and film sensitivity as other members. The photometric circuit should include semiconductor elements, e.g., C-MOS IC, whose electric consumption is small, as much as possible.

Figure 4:
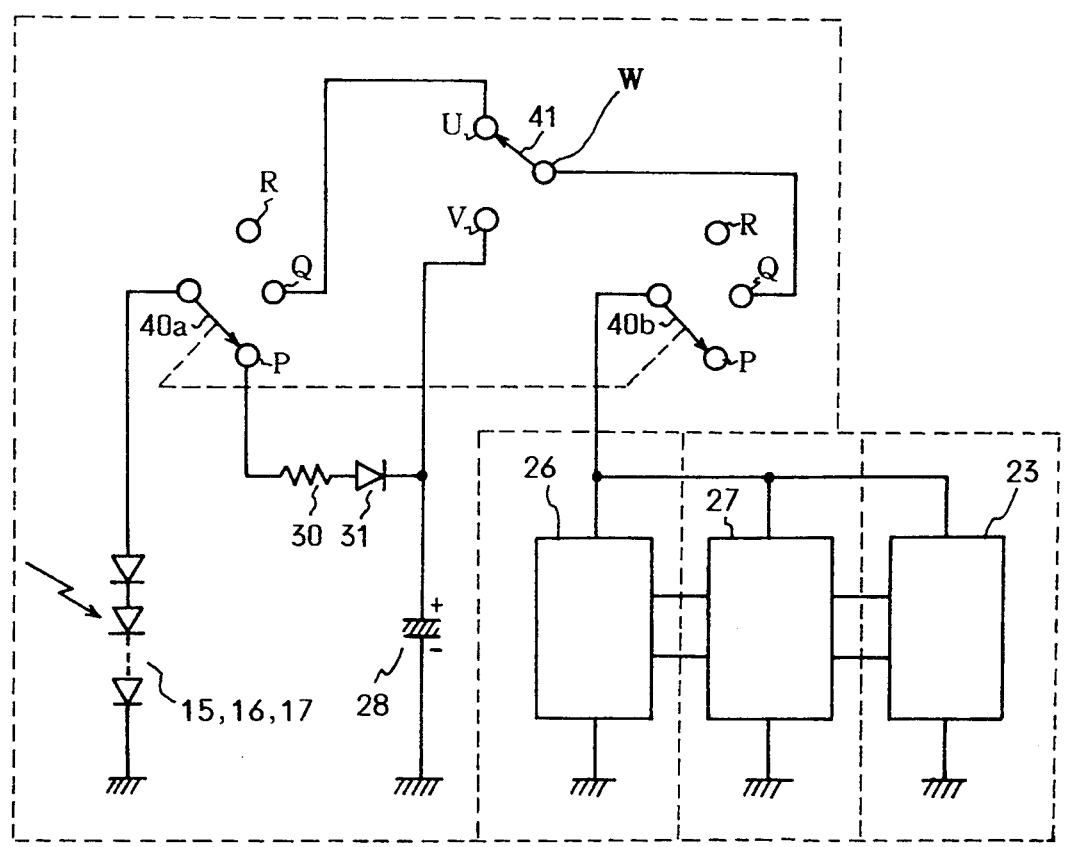
FIG. 4 is a circuit diagram of the camera.

A circuit diagram of the camera 10 is shown in FIG. 4.

The solar cells 15, 16 and 17 are shown in FIG. 4. The photometric circuit 26 is also shown therein.

A driver circuit 27 for driving the LCD unit 23 is, for example, an IC, and connects the photometric circuit 26 and the LCD unit 23. The driver circuit 27 should be formed by semiconductor elements, e.g., C-MOS IC, whose electric consumption is small.

The photometric circuit 26, the driver circuit 27 and the LCD unit 23 are connected parallel and form an electric section.

An electrolytic capacitor 28 being charged electric power has a great capacitance.

Release switches 40a and 40b switch circuits with movement of the shutter release button 18. The release switches 40a and 40b are linked and moved together. Each release switch 40a and 40b has three terminals P, Q and R for switching two circuits.

A selecting switch 41 is capable of selecting a terminal U, at which the terminal Q of the release switch 40b is connected to the terminal Q of the release switch 40a, and a terminal V, at which the terminal Q of the release switch 40b is connected to the capacitor 28. The selecting switch 41 is driven to select the terminals U and V by manually operating a selecting switch button 42 shown in FIGS. 1 and 2.

While the shutter release button 18 is not pushed, the release switches 40a and 40b are connected to the terminal P. In this case, the solar cells 15, 16 and 17 are connected to the capacitor 28 via a resistance 30 for charging and a diode 31, so that the solar cells 15, 16 and 17 and the capacitor 28 are disconnected to the photometric circuit 26, the driver circuit 27 and the LCD unit 23.

When the shutter release button 18 is half pushed, the release switches 40a and 40b are connected to the terminals Q. In this case, if the selecting switch 41 is connected to the terminal U, the solar cells 15, 16 and 17 are connected to the photometric circuit 26, the driver circuit 27 and the LCD unit 23; the capacitor 28 is disconnected thereto. On the other hand, if the selecting switch 41 is connected to the terminal V, the solar cells 15, 16 and 17 are disconnected to the photometric circuit 26, the driver circuit 27 and the LCD unit 23; the capacitor 28 is connected thereto.

When the shutter release button 18 is further and fully pushed, the release switches 40a and 40b are connected to the terminals R, so that the shutter of the camera 10 is opened to take a picture.

Figure 5:
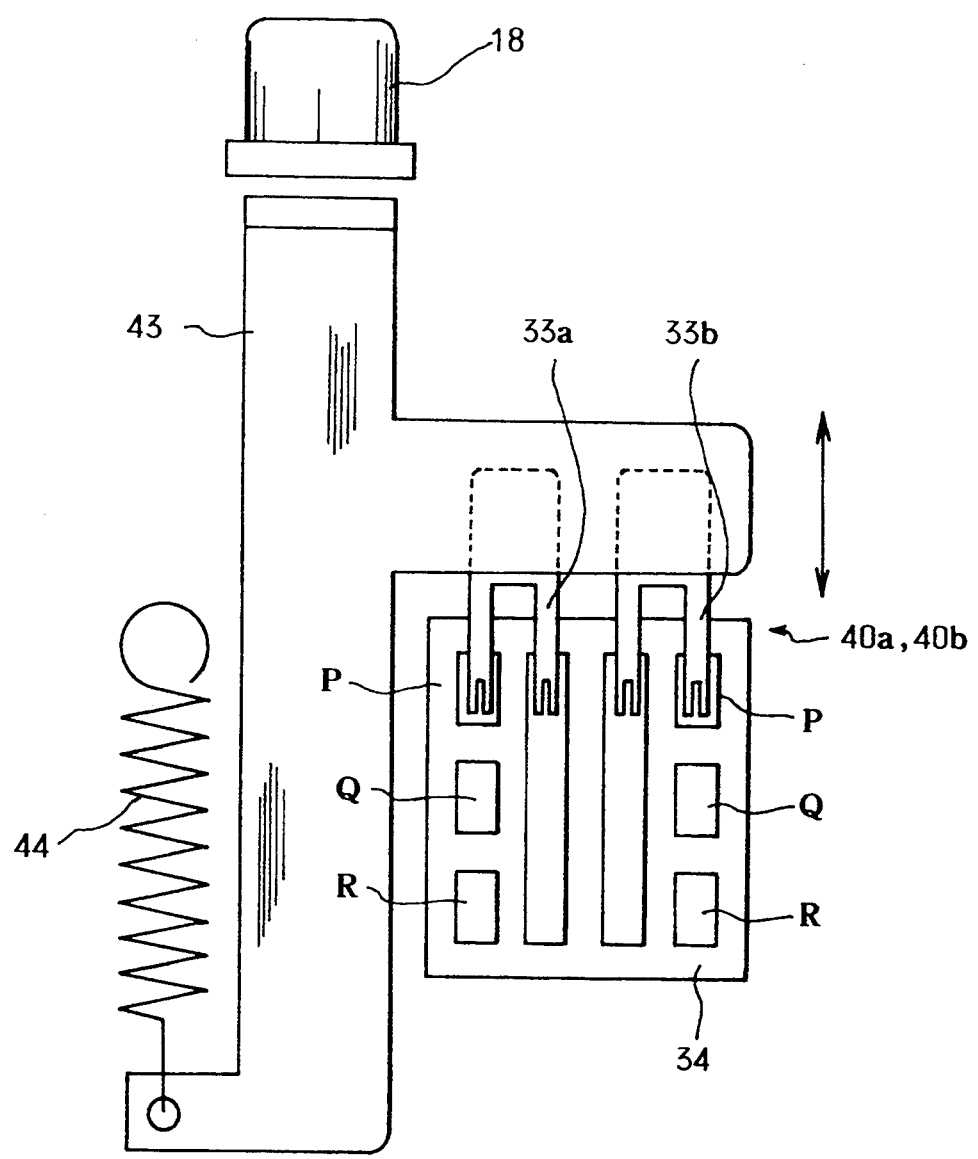
FIG. 5 is an explanation view of a release switch.

A concrete example of the release switch 40a or 40b is shown in FIG. 5. There are provided a couple of slide brushes 33a and 33b, between which an insulator (not shown) is provided, on a release plate 43. The terminals P, Q and R are formed on a substrate 34.

While in a normal condition, the slide brushes 33a and 33b are connected to the terminals P. If the shutter release button 18 is half pushed against a spring 44, the slide brushes 33a and 33b are connected to the terminals Q. And if the shutter release button 18 is fully pushed, the slide brushes 33a and 33b are connected to the terminals R.

Figure 6:
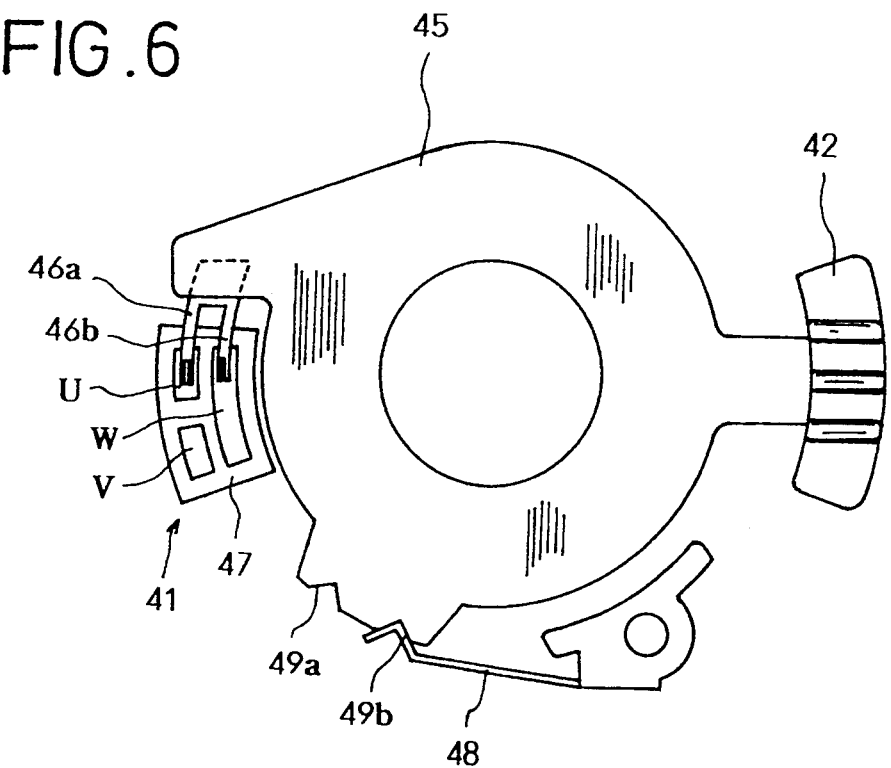
FIG. 6 is an explanation view of a selecting switch.

A concrete example of the selecting switch 41 is shown in FIG. 6.

A lever 45 is rotatably attached to a shaft of the film sensitivity setting dial 25. The selecting switch button 42 is provided at one end of the lever 45; slide brushes 46a and 46b, between which an insulator is provided, are provided at the other end thereof. By turning the lever 45, the slide brush 46a contacts the terminal U or V, which are formed on a substrate 47. On the other hand, the slide brush 46b always contacts the terminal W (see FIG. 4).

A click spring 48 is provided in the camera 10. A one end of the click spring 48 can be engaged with notches 49a and 49b of the lever 45 so as to stably hold the slide brush 46a at specific positions at which the slide brush 46a contacts the terminal U or V.

Successively, the action of the camera 10 will be explained.

Because the solar cells 15, 16 and 17 are provided on the upper cover 12 of the camera 10, they can receive the sun light effectively.

While the solar cells 15, 16 and 17 receive the sun light and generates electric power, the selecting switch 41 is set to connect to the terminal U (see FIG. 4).

Firstly, distance measuring and focusing are executed.

Next, the lens opening and the shutter speed are set. If the shutter release button 18 is half pushed, the release switches 40a and 40b are connected to the terminals Q (see FIG. 4). The solar cells 15, 16 and 17 supply electric power to the photometric circuit 26, the driver circuit 27 and the LCD unit 23, so that a result of photometry will be shown by the LCD unit 23.

If the shutter release button 18 is further pushed, the release switches 40a and 40b are connected to the terminals R, so that the shutter is opened to take a picture.

Because the photometric circuit 26 and the driver circuit 27 include semiconductor elements, e.g., C-MOS IC, whose electric consumption is small, they can be driven by small solar electric power from the solar cells 15, 16 and 17.

While the shutter release button 18 is not pushed, the release switches 40a and 40b are connected to the terminals P. Thus, electric power from the solar cells 15, 16 and 17 is supplied to the capacitor 28 via the resistance 30 and the diode 31 to charge. Generated voltage of the solar cells 15, 16 and 17 is dropped at the resistance 30 and the diode 31, so the dropped voltage is charged to the capacitor 28.

If the sun light is brighter, the solar cells 15, 16 and 17 generate higher voltage, so that the capacitor 28 is charged with higher voltage. On the other hand, if the sun light is too weaker, the the solar cells 15, 16 and 17 cannot generate voltage higher than voltage through the capacitor 28. If the voltage through the capacitor 28 is higher than the charging voltage, the capacitor 28 tries to discharge but, in this embodiment, the diode 31 prevents the capacitor 28 to discharge. Therefore, the voltage level through the capacitor 28 can be maintained.

In dark places where the solar cells 15, 16 and 17 cannot generate enough electric power, the selecting switch 41 is set to connect to the terminal V (see FIG. 4). Then the shutter release button 18 is half pushed so as to connect the release switches 40a and 40b to the terminals Q (see FIG. 4), the capacitor 28 discharges to supply electric power to the photometric circuit 26 and the LCD unit 23.

In the present embodiment, the clean solar cells 15, 16 and 17, which can be semi-eternally used, is used as the electric source, and the camera 10 can be used not only in light places but also in dark places.

Figure 7:
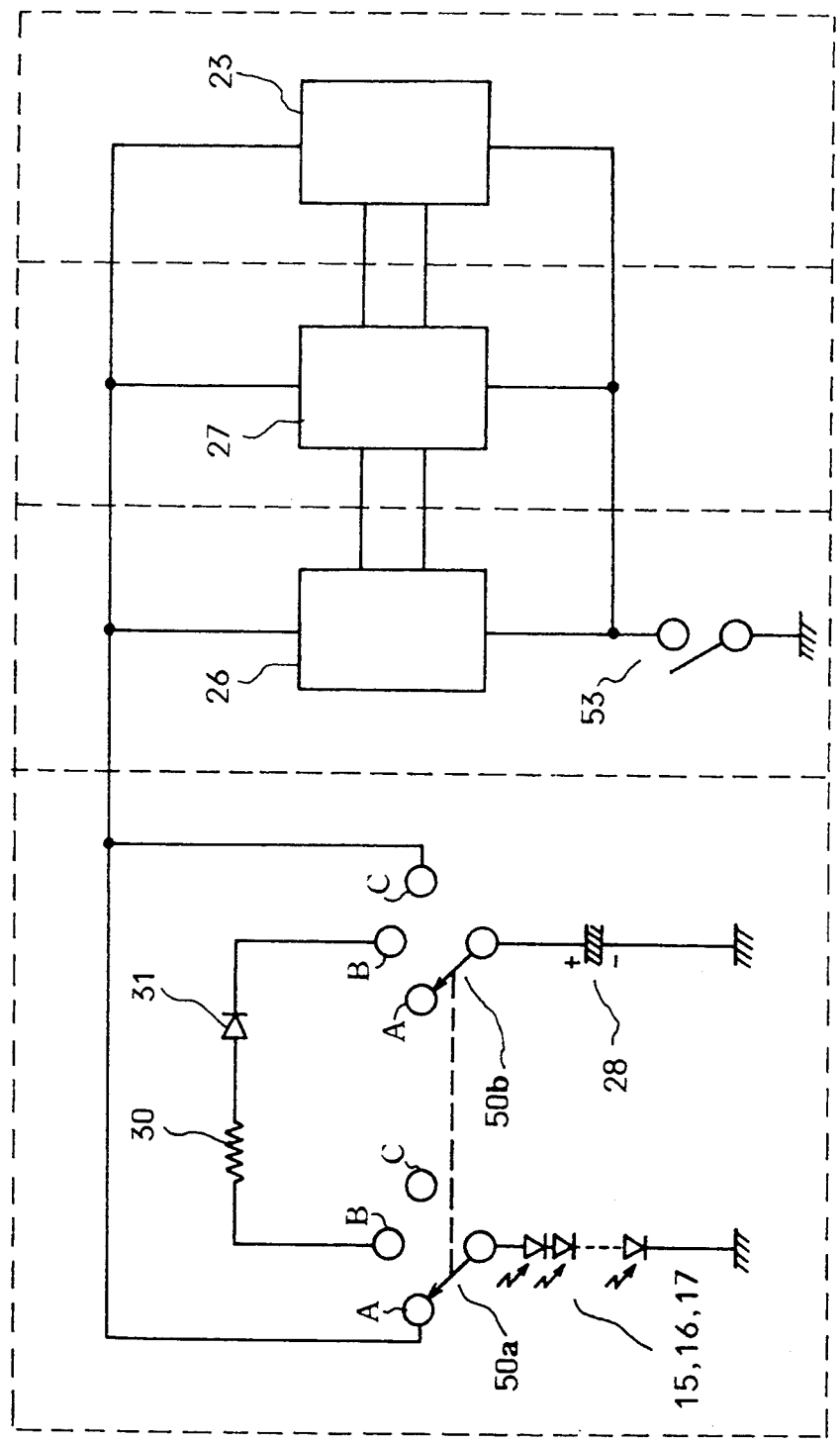
FIG. 7 is a circuit diagram of another embodiment.

Another embodiment will be explained. FIG. 7 is a circuit diagram of the another embodiment. Note that, elements, which have been shown in the former embodiment, are assigned same reference numerals, and explanation will be omitted.

Mode selecting switches 50a and 50b are linked and moved together. Each mode selecting switch 50a and 50b has three terminals A, B and C to be selected. If the mode selecting switches 50a and 50b are connected to the terminals A, the solar cells 15, 16 and 17 are connected to the photometric circuit 26, the driver circuit 27 and the LCD unit 23, and the capacitor 28 is disconnected thereto. If the mode selecting switches 50a and 50b are connected to the terminals B, the solar cells 15, 16 and 17 are connected to the capacitor 28 via the resistance 30 and the diode 31. If the mode selecting switches 50a and 50b are connected to the terminals C, the solar cells 15, 16 and 17 are disconnected to the photometric circuit 26, the driver circuit 27 and the LCD unit 23, and the capacitor 28 is connected thereto.

A release switch 53 is driven when the shutter release button 18 is half pushed. The release switch 53 turns on and off the photometric circuit 26, the driver circuit 27 and the LCD unit 23.

Figure 8:
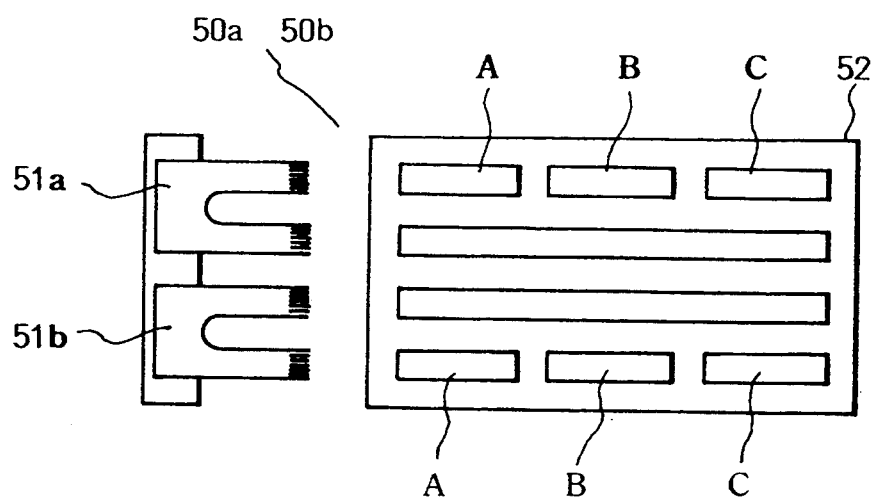
FIG. 8 is an explanation view of a mode selecting switch.

A concrete example of the mode selecting switches 50a and 50b is shown in FIG. 8. A couple of slide brushes 51a and 51a are linked and moved together. The terminals A, B and C are formed on a substrate 52. The slide brushes 51a and 51b can be manually moved by the mechanism, which is, for example, shown in FIG. 6.

Successively, the action will be explained.

While the solar cells 15, 16 and 17 receive the sun light and generates electric power, the mode selecting switches 50a and 50b are connected to the terminal A (see FIG. 7).

Firstly, distance measuring and focusing are executed.

Next, the lens aperture and the shutter speed are set. If the shutter release button 18 is half pushed, the release switch 53 is closed. The solar cells 15, 16 and 17 supply electric power to the photometric circuit 26, the driver circuit 27 and the LCD unit 23, so that a result of photometry will be shown by the LCD unit 23.

If the shutter release button 18 is further pushed, the shutter is opened to take a picture.

Because the photometric circuit 26 and the driver circuit 27 include semiconductor elements, e.g., C-MOS IC, whose electric consumption is small, they can be driven by small solar electric power from the solar cells 15, 16 and 17.

In the normal condition, the mode selecting switches 50a and 50b are connected to the terminals B (see FIG. 7). Thus, electric power from the solar cells 15, 16 and 17 is supplied to the capacitor 28 via the resistance 30 and the diode 31 to charge. Generated voltage of the solar cells 15, 16 and 17 is dropped at the resistance 30 and the diode 31, so the dropped voltage is charged to the capacitor 28.

If the sun light is brighter, the solar cells 15, 16 and 17 generate higher voltage, so that the capacitor 28 is charged with higher voltage. On the other hand, if the sun light is too weaker, the solar cells 15, 16 and 17 cannot generate voltage higher than voltage through the capacitor 28. If the voltage through the capacitor 28 is higher than the charging voltage, the capacitor 28 tries to discharge but, in this embodiment, the diode 31 prevents the capacitor 28 to discharge. Therefore, the voltage level through the capacitor 28 can be maintained.

In dark places where the solar cells 15, 16 and 17 cannot generate enough electric power to drive the electric section, the mode selecting switches 50a and 50b are connected to the terminal C (see FIG. 7). Then the shutter release button 18 is half pushed so as to close the release switch 53, the capacitor 28 discharges to supply electric power to the photometric circuit 26 and the LCD unit 23.

Afterwards, if the shutter release button 18 is fully pushed, the shutter is opened to take a picture.

In the present embodiment, the clean solar cells 15, 16 and 17, which can be semi-eternally used, is used as the electric source, and the camera 10 can be used not only in light places but also in dark places.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In a camera comprising an electric section, which includes a photometric circuit, a display unit for showing a result of photometry, and a driver circuit for driving said display unit, and an electric source for supplying electric power to said electric section,
   wherein the improvement comprises:
   a solar cell, as said electric power source, being provided in an upper cover of said camera;
   a capacitor being charged by the electric power, which is generated by said solar cell;
   a release switch being linked with a shutter release button, said release switch connecting said solar cell and said capacitor and disconnecting said solar cell and said capacitor when said shutter release button is half pushed, said release switch driving a shutter when said shutter release button is fully pushed; and
   a selecting switch being connected to said release switch, said selecting switch having,
   a first position, at which said solar cell and said electric section are connected and said capacitor and said electric section are disconnected, and
   a second position, at which said solar cell and said electric section are disconnected and said capacitor and said electric section are connected.

2. The camera according to claim 1,
   wherein a plurality of solar cells are serially connected.

3. The camera according to claim 1
   Wherein said photometric circuit and said driver circuit include semiconductor elements whose electric consumption is small.

4. The camera according to claim 2
   Wherein said photometric circuit and said driver circuit include semiconductor elements whose electric consumption is small.

5. In a camera comprising an electric section, which includes a photometric circuit, a display unit for showing a result of photometry, and a driver circuit for driving said display unit, and an electric source for supplying electric power to said electric section,
   wherein the improvement comprises:
   a solar cell, as said electric power source, being provided in an upper cover of said camera;

a capacitor being charged the electric power, which is generated by said solar cell;

a release switch for driving said electric section when a shutter release button is half pushed; and a mode selecting switch for changing modes of said camera to, a first mode, in which said solar cell is connected to said electric section, said solar cell is disconnected to said capacitor and said capacitor is disconnected to said electric section, a second mode, in which said solar cell is connected to said capacitor and said electric section is disconnected to said solar cell and said capacitor, and a third mode, in which said capacitor is connected to said electric section, said solar cell is disconnected to said capacitor and said solar cell is disconnected to said electric section.

6. The camera according to claim 5, wherein a plurality of solar cells are serially connected.

7. The camera according to claim 5, Wherein said photometric circuit and said driver circuit include semiconductor elements whose electric consumption is small.

8. The camera according to claim 6, Wherein said photometric circuit and said driver circuit include semiconductor elements whose electric consumption is small.

* * * * *